US011028958B2

United States Patent
Sander et al.

(10) Patent No.: US 11,028,958 B2
(45) Date of Patent: *Jun. 8, 2021

(54) AUTOMATED PIG LAUNCHING SYSTEM

(71) Applicant: WeldFit Corporation, Houston, TX (US)

(72) Inventors: Russ C. Sander, Houston, TX (US); David D. Wint, Tulsa, OK (US); Todd K. Sale, Friendswood, TX (US); Roxy R. Riggs, Houston, TX (US); Douglas A. Sahm, Lutz, FL (US); Greg J. Drzewiecki, Woodstock, IL (US)

(73) Assignee: WeldFit Corporation, Houston, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/957,656

(22) Filed: Apr. 19, 2018

(65) Prior Publication Data

US 2018/0306373 A1 Oct. 25, 2018

Related U.S. Application Data

(63) Continuation of application No. 14/963,751, filed on Dec. 9, 2015, now Pat. No. 9,976,686.

(60) Provisional application No. 62/090,057, filed on Dec. 10, 2014.

(51) Int. Cl.
*B08B 9/055* (2006.01)
*F16L 55/46* (2006.01)

(52) U.S. Cl.
CPC .............. *F16L 55/46* (2013.01); *B08B 9/055* (2013.01)

(58) Field of Classification Search
CPC ................................. B08B 9/055; F16L 55/46
See application file for complete search history.

(56) References Cited

U.S. PATENT DOCUMENTS

| 3,404,421 A | 10/1968 | Surber |
| 4,135,949 A | 1/1979 | Reese |
| 4,709,719 A | 12/1987 | Littleton et al. |
| 5,139,576 A | 8/1992 | Davis |

(Continued)

FOREIGN PATENT DOCUMENTS

| CO | 95036549 A1 | 8/1995 |
| RU | 2103596 | 1/1998 |
| WO | 1999023438 A1 | 5/1999 |

OTHER PUBLICATIONS

Weldfit Energy Group. "Custom Fittings, Extruded Headers, Pigging Technologies and Pressure Vessels for the Oil & Gas Industries." www.weldfit.com: Sep. 2014, pp. 1-8.

(Continued)

*Primary Examiner* — Randall E Chin
(74) *Attorney, Agent, or Firm* — Blank Rome LLP

(57) ABSTRACT

A pigging system has an apparatus for launching one or more pigs into a process flow. The apparatus has a housing with a chamber, an inlet, and an outlet. The inlet receives the one or more pigs into the chamber and is sealable. The outlet is in sealed communication with the process flow and passes the one or more pigs out of the chamber to the process flow. A portion of the chamber is in communication with the process flow. A guide disposed in the chamber guides the one or more pigs in the chamber, and an actuator mechanically feeds the one or more pigs guided by the guide to the outlet.

26 Claims, 12 Drawing Sheets

(56) References Cited

U.S. PATENT DOCUMENTS

| | | | |
|---|---|---|---|
| 5,219,244 A * | 6/1993 | Skeels | F16L 55/46 15/104.062 |
| 6,022,421 A | 2/2000 | Bath et al. | |
| 6,336,238 B1 | 1/2002 | Tarlton | |
| 6,428,241 B1 | 8/2002 | Stracke et al. | |
| 6,533,032 B1 | 3/2003 | Seixas et al. | |
| 6,925,671 B1 | 8/2005 | Mouton | |
| 8,052,801 B2 | 11/2011 | Freeman et al. | |
| 2002/0053354 A1 | 5/2002 | McCanna et al. | |
| 2002/0116776 A1 | 8/2002 | Stracke et al. | |
| 2002/0170599 A1 | 11/2002 | Disher et al. | |
| 2010/0132737 A1 | 6/2010 | Mousa | |
| 2011/0100479 A1 | 5/2011 | Devine | |
| 2012/0131758 A1 | 5/2012 | Bacon | |
| 2013/0037626 A1 | 2/2013 | van Leyen et al. | |
| 2013/0111680 A1 | 5/2013 | Archer et al. | |
| 2013/0212820 A1* | 8/2013 | Burns | F16L 55/46 15/104.062 |
| 2013/0212821 A1 | 8/2013 | Tyrrell et al. | |

OTHER PUBLICATIONS

Extended European Search report issued in European Counterpart Application No. 15867535.5, dated Jul. 9, 2018.

Decision on Grant in Counterpart Russian Patent Application No. 2017124114 dated Dec. 19, 2019.

Office Action dated Mar. 22, 2019 in Counterpart Colombian Patent Application No. NC2017/0006226 [with English translation].

Office Action dated Aug. 15, 2018 in Counterpart Colombian Patent Application No. NC2017/0006226 [with English translation].

Office Action dated Sep. 10, 2019 in Counterpart Canadian Patent Application No. 2,970,485.

PCT International Search Report for corresponding application No. PCT/US15/64727; dated Feb. 2, 2016; pp. 1-2.

Office Action dated Oct. 22, 2018 in Counterpart Russian Patent Application No. 2017124114 [with English translation].

* cited by examiner

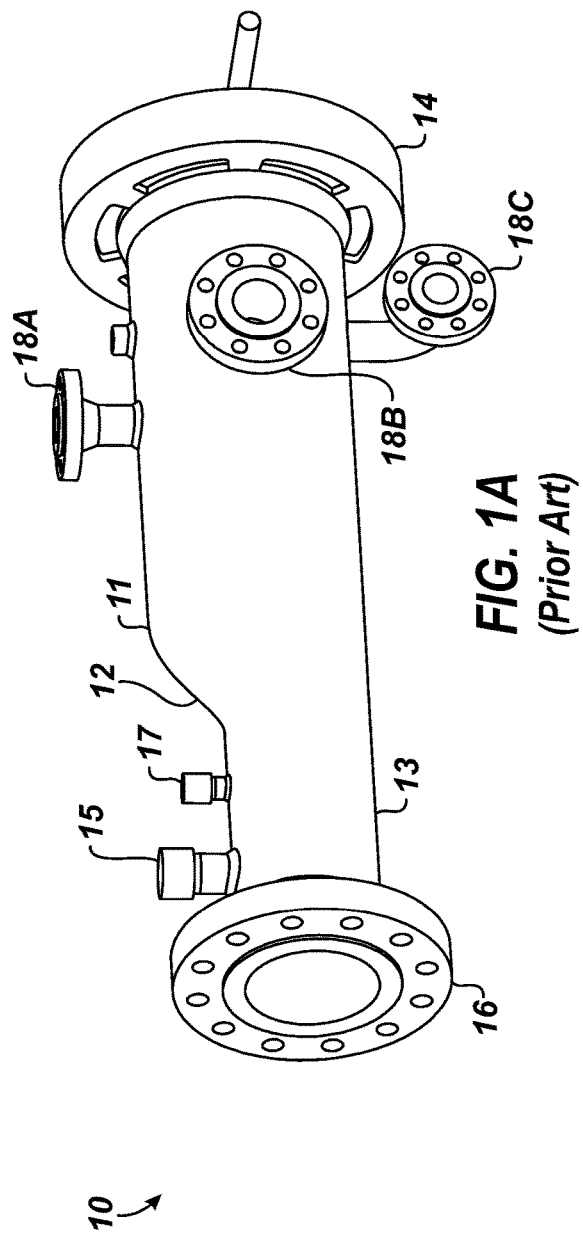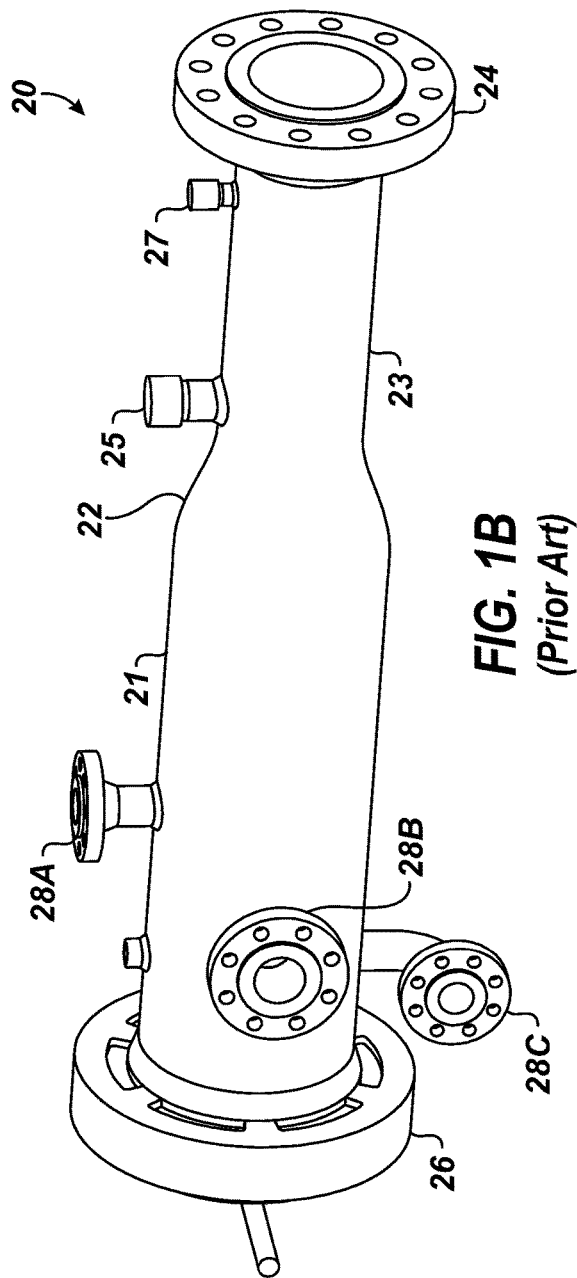
FIG. 1A (Prior Art)
FIG. 1B (Prior Art)

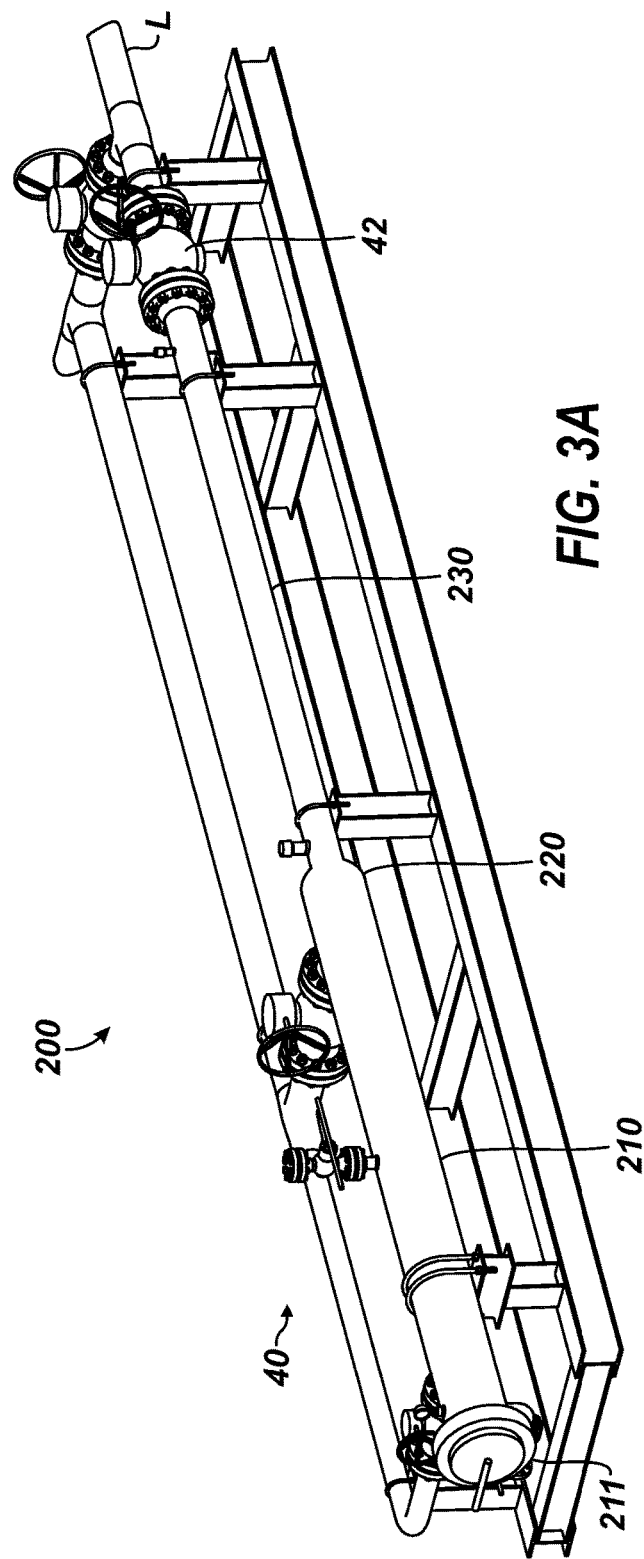
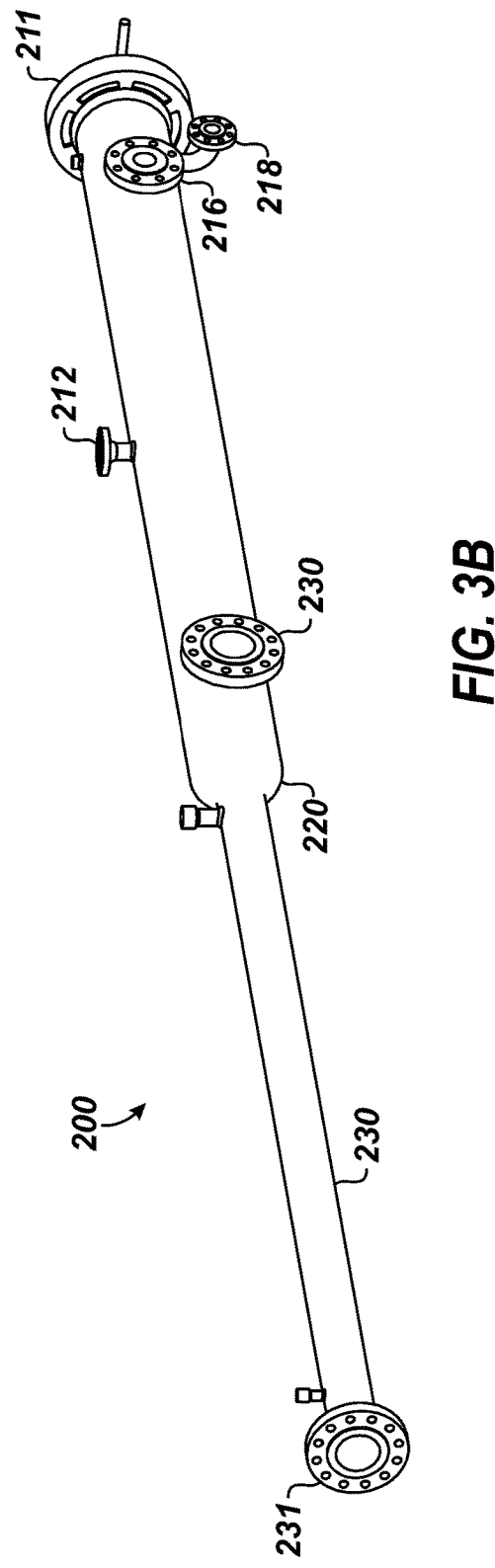
FIG. 3A
FIG. 3B

FIG. 10A — 176a

SET # PIGS LOADED
PIG LENGTH
BACK
LAUNCH TIMING
PADDLE POSITION: ### IN FROM CLOSURE
PIGS IN BARREL
MOVE PADDLE FORWARD
MOVE PADDLE BACKWARD

FIG. 10B — 176b

SYSTEM STATUS
DATE:
TIME:
CONTROL MODE: AUTO
LAST LAUNCH: #
NEXT LAUNCH: #
RECENT ACTIVITY
EVENT LOG #1
EVENT LOG #2
PADDLE POSITION: ### IN FROM CLOSURE
PIGS IN BARREL
LOGIN:

FIG. 10C — 176c

BACK
LAUNCH INTERVAL
HRS
FIRST LAUNCH
DATE: __/__
TIME: __:__
SAVE

FIG. 10D — 176d

BACK
PIG LENGTH
INCHES
SAVE

AUTOMATED PIG LAUNCHING SYSTEM

CROSS-REFERENCE TO RELATED APPLICATIONS

This is a continuation of U.S. patent application Ser. No. 14/963,751, filed 9 Dec. 2015, now U.S. Pat. No. 9,976,686, which is a non-provisional of U.S. Patent Application Ser. No. 62/090,057, filed 10 Dec. 2014, both of which are incorporated herein by reference in their entireties and to which priority is claimed.

FIELD OF THE DISCLOSURE

This subject matter of the present disclosure relates to devices and methods for launching pipeline pigs. More specifically, the disclosed subject matter relates to a system and methods for staging multiple pigs of any type and launching them individually with a fully-automated, semi-automated, or manually-operated pig launch system that can be horizontally oriented.

BACKGROUND OF THE DISCLOSURE

Pigging systems are installed on pipeline systems for the purpose of inserting a pipeline pig without interruption of the pipeline flow. Pipeline pigs are typically sized to the nominal pipeline diameter and configured of different designs and materials to serve the purpose of cleaning, liquid removal, drying, batching, chemical treatment, or inspection. Traditional pigging systems (sometimes known as launchers and receivers) have been utilized for decades to insert and retrieve pipeline pigs without interrupting the product flow. The launcher is installed upstream in the traditional pigging system and the receiver unit is installed downstream of the section of the pipeline to be pigged.

FIG. 1A illustrates a pig launcher 10 according to the prior art, and FIG. 1B illustrates a pig receiver 20 according to the prior art. Briefly, the launcher 10 has an oversized barrel section 11 connected by an eccentric reducer 12 to a nominal line section 13. A closure 14 on the barrel section 11 provides access to its interior for inserting a pig (not shown). The line section 13 has a flange 16 for connecting to a line pipe of a piping system. The barrel section 11 includes a blow-down connection 18A, a kicker connection 18B, and a drain connection 18C. The line section 13 includes a pig signaler 15 and a vent 17.

The receiver 20 is similar and has a nominal line section 23 connected by a concentric reducer 22 to an oversized barrel section 21. A closure 26 on the barrel section 21 provides access to its interior for removing pigs (not shown). The line section 23 has a flange 24 for connecting to a line pipe of the piping system. The barrel section 21 includes a blow-down connection 28A, a bypass connection 28B, and a drain connection 28C. The line section 23 includes a pig signaler 25 and a vent 27.

These units 10, 20 are isolated from the mainline with isolation valves (not shown) to allow the pressure to be released and the product drained or vented so that pipeline pigs can be inserted or retrieved from the pipeline system with no pressure or product in the launcher 10 and receiver 20. Such traditional units 10, 20 of the pigging system as shown in FIGS. 1A-1B are manually operated to launch and receive a single pipeline pig for each pigging operation.

Other pigging systems in the art have an automated pig launcher that can provide improved pipeline flow efficiency, cost savings, and safety by not requiring each pig to be loaded individually. To date, automated pig launchers use a vertical or angled design orientation where the pipeline pigs are gravity fed to the downstream launch mechanism. In particular, the existing launch mechanism has two pins that are retracted by means of hydraulics or pneumatics allowing the pipeline pig to be launched by gravity. Additionally, current automated pig launchers are designed for a specific type of pig and product type.

Because current automated pigging systems are gravity fed, the systems need to be elevated at an installation. This requires the installation to have a platform to provide access to the system components and requires lifting equipment to be used for the operation of the unit. Additionally, because current automated pigging systems use hydraulics or pneumatics to actuate launch mechanism, the existing system requires supply gas to drive the hydraulics, which complicates the installation and its operation. In fact, the controller for these current automated pigging systems can be complex, making them harder to operate and maintain.

The subject matter of the present disclosure is directed to overcoming, or at least reducing the effects of, one or more of the problems set forth above.

SUMMARY OF THE DISCLOSURE

A method and system stages multiple pigs and individually launches each pig in a fully-automated, semi-automated, or manually operated manner. The system has a launcher oriented in a horizontal position with a flow-through barrel and a launch mechanism. In general, the launch mechanism can be operated by a programmable logic controller, a user-operated switch, or manual operation.

In one embodiment, the launch mechanism can use a geared feed screw system that moves a paddle along the internal length of the oversized launch barrel to advance the pigs staged in the barrel. The staged pigs are engaged with the paddle of the geared feed screw launch mechanism, and one of the pipeline pigs is pushed into a reducer transitioning the larger diameter barrel to a pipeline section of the launcher. Differential pressure is created when the pig seals at least partially in the area of the reducer of the launcher located downstream of a flow-through nozzle. The process flow behind the advanced pig then allows the pig to be launched into the downstream piping. The gears on the drive mechanism can be manually operated, operated on-demand, or programed with an independent controller that allows pig launches to be made at a specific time or time interval.

The launcher does not require gravity to feed the pigs. Therefore, the launcher can be positioned horizontal at a site. This has the benefits of eliminating the need for an elevated platform and associated structures, lifting equipment, and the like. In addition, the horizontal arrangement reduces costs and the complexity of ancillary piping.

In general, the launch mechanism includes a guide and an actuator. The mechanism can use a motor, a feed screw, a cable, a cylinder, or other drive member used in conjunction with a paddle, a cradle, a tray, or the like. Pigs may also be positioned for launch using a conveyor belt type mechanism.

In the system, the launcher has a pipeline connection flange through which process flow normally flows. Pigs are positioned for launch using the controlled feed of the launch mechanism, which is independent of the particular pig. The launch and sequencing are not dependent on specific pig dimensions and can be programmed, thereby allowing the use of pigs of varying purpose, dimensions, and manufacture. Pigs for differing purpose and physical size/configuration may be loaded in the same batch. Finally, the flow-through pipeline connection on the launcher obviates the need for actuating pipeline valves. This reduces cost and complexity of unit.

In operation, process flow is initially diverted from the launcher, and any residual fluid is drained from the launcher. The closure door of the launcher is opened to provide access to the launcher's chamber. A batch of pigs is loaded in the launcher, which is then closed and filled with process flow.

Pig information and launch requirements are entered into the controller, and flow is redirected through the launcher. At the programed time, a pig is fed into the process flow by the launch mechanism and launched. The pig moves through the pipeline, accomplishes an intended task, and ultimately enters a receiver. At the programed time, the next pig in sequence is moved into the process flow and launched to move through pipeline and then enter the receiver. The sequence can be repeated until an entire batch of pigs is launched and received. A typical batch quantity can be about seven pigs.

The foregoing summary is not intended to summarize each potential embodiment or every aspect of the present disclosure.

BRIEF DESCRIPTION OF THE DRAWINGS

FIG. 1A illustrates a pig launcher according to the prior art.

FIG. 1B illustrates a pig receiver according to the prior art.

FIG. 3A illustrates a perspective view of a pig receiver according to the present disclosure with flow-through and flow-exit piping.

FIG. 3B illustrates a perspective view of the disclosed pig receiver without the additional piping.

FIG. 10A-10D show example user interface screens for a controller of the disclosed pig launcher.

DETAILED DESCRIPTION OF THE DISCLOSURE

A. Pigging System

A pigging system of the present disclosure includes a pig launcher 100 (FIGS. 2A-2C) and a pig receiver 200 (FIGS. 3A-3B) for a pipeline. As will be appreciated, a typical pipeline can conduct any type of process flow, product, or non-solid material, such as a gas, a liquid, or a colloidal suspension capable of being transported through the pipeline. Examples of products that are transported through a pipeline may include: natural gas, propane, crude oil, water, and petroleum condensate.

The pig launcher 100 is assembled on the pipeline from where pigs P are to be launched to perform an intended task related to pigging. The launcher 100 is typically placed at the start of a pipeline section to be pigged. For its part, the pig receiver 200 is assembled on the pipeline to where pigs P are received after performing their intended tasks related to pigging. The receiver 200 is typically placed at the end of a pipeline section to be pigged.

As is known, a pig P is a device that is inserted into the pipeline to perform a specific task. In various embodiments, pigs P may be utilized to perform tasks that may include: cleaning, liquid removal, drying, batching, chemical treatment, and inspection. A pig may be unidirectional or bidirectional.

Figure 2A:
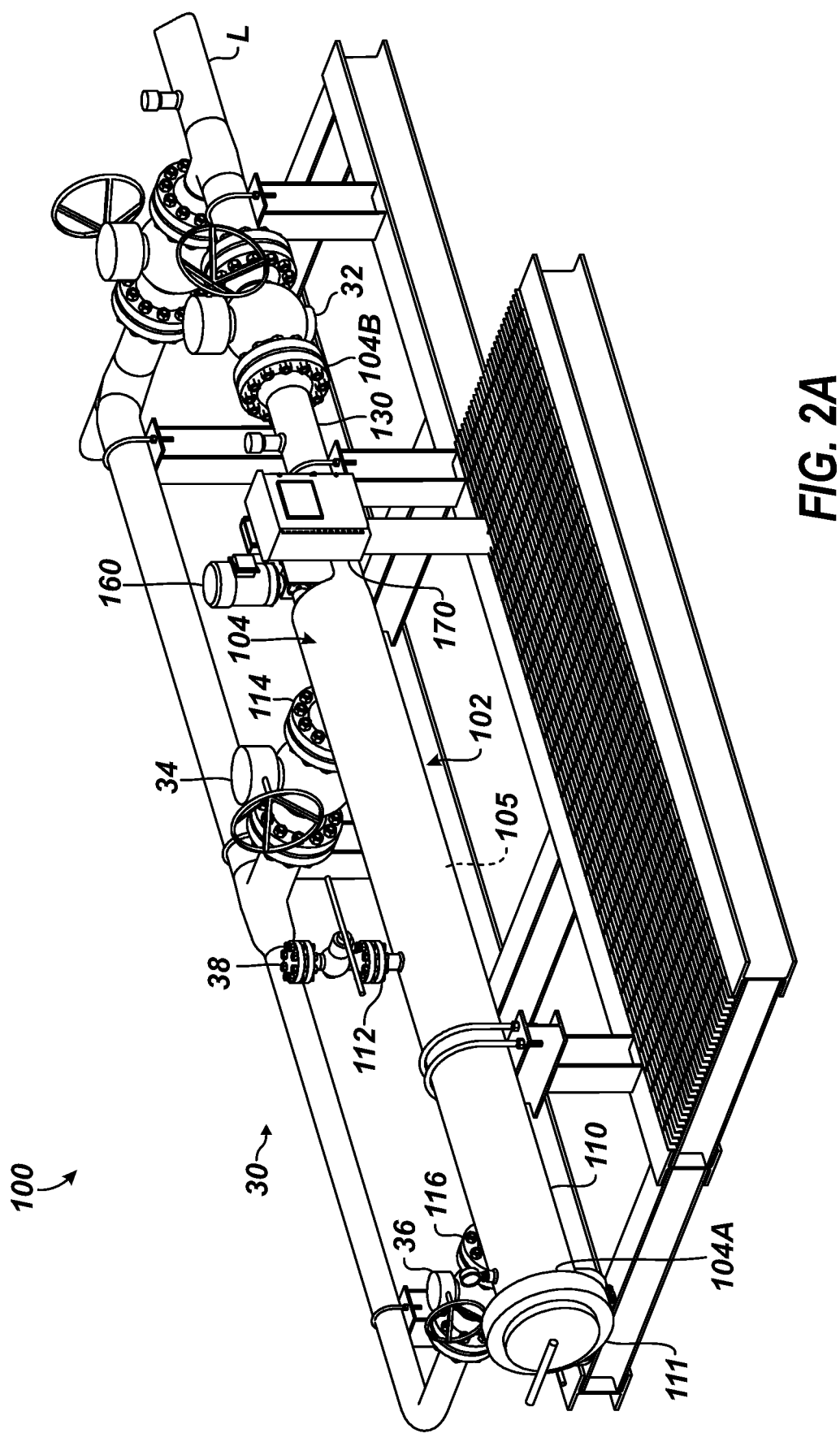
FIG. 2A illustrates a perspective view of a pig launcher according to the present disclosure with flow-through and kicker piping.
Figure 2B:
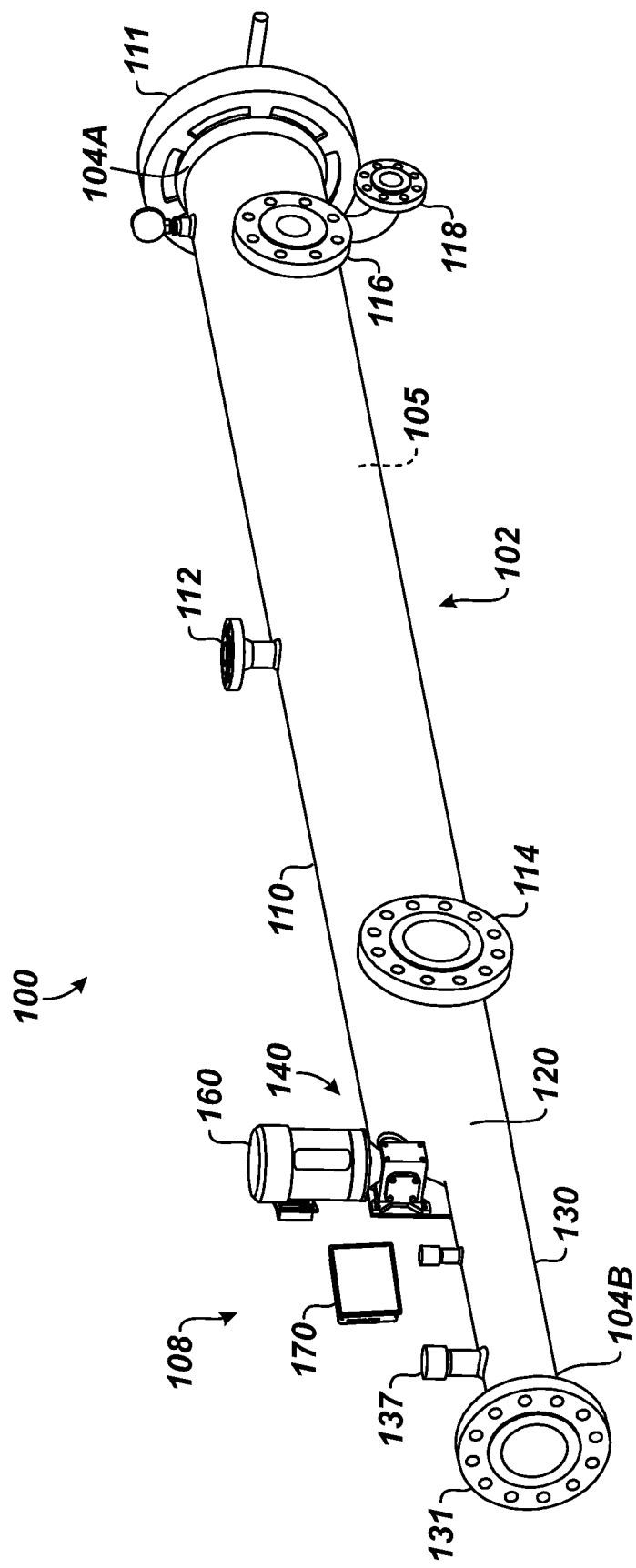
FIG. 2B illustrates a perspective view of the disclosed pig launcher isolated from the additional piping.
Figure 2C:
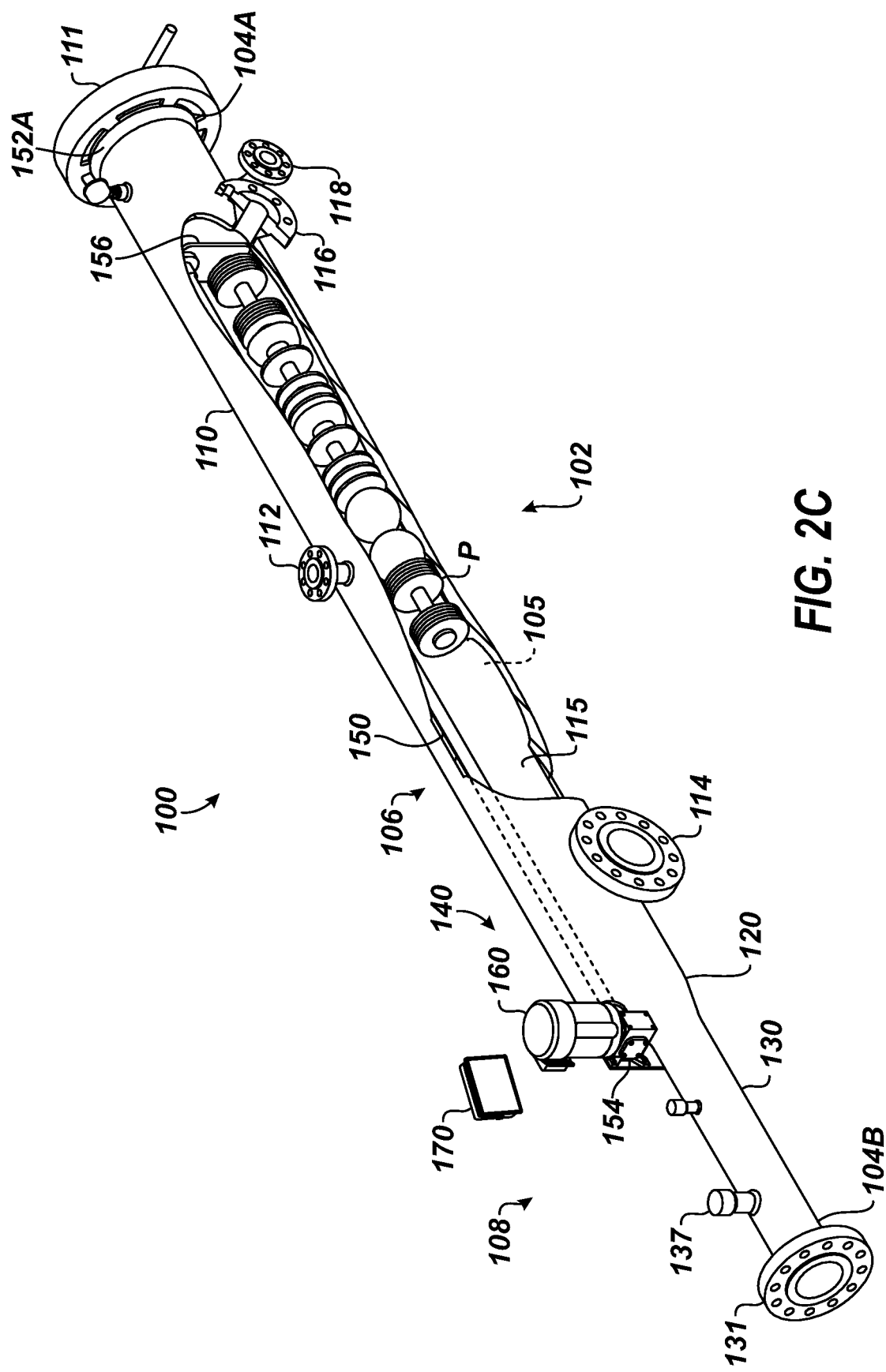
FIG. 2C illustrates a perspective view of the disclosed pig launcher with a cutaway showing internal components thereof.

In FIG. 2A, the pig launcher 100 is shown with additional piping 30, while the pig launcher 100 is shown in an isolated view in FIG. 2B and is shown with internal components visible in FIG. 2C. The pig launcher 100 is used for staging multiple pigs P and launching them individually into a pipeline (not shown) via an introductory pipe or line L. As discussed below, operation of the pig launcher 100 can be fully-automated, semi-automated, or manual, as desired for a particular implementation.

The pig launcher 100 includes a housing 102 defining a chamber 105 and having an inlet 104A and an outlet 104B. The inlet 104A receives one or more pigs P into the chamber 105 and is sealable, for example, using a closure 111, such as a door. The outlet 104B connects in sealed communication with the process flow in the line L of the piping system 30. The outlet 104B passes the one or more pigs P out of the chamber 105 to the process flow.

Internally as best shown in FIG. 2C, a guide 106 is disposed in the chamber 105 and guides the one or more pigs P in the chamber 105. Additionally, an actuator 108 mechanically feeds the one or more pigs P guided by the guide 106 to the outlet 104B. A portion of the chamber 105 is in communication with the process flow of the piping system 30 via a number of connections and valves discussed below.

In FIG. 3A, the pig receiver 200 is shown with additional piping 40 for flow-through and flow-exit, while the pig receiver 200 is shown in an isolated view in FIG. 3B. The pig receiver 200 includes a nominal line pipe section 230, a concentric reducer 220, and an oversized barrel section 210. The receiver's barrel section 210 is of extended length to accommodate multiple pigs received from the line L to which the receiver 200 is coupled with an isolation valve 42.

Looking more closely now at the pig launcher 100 of FIGS. 2A-2C, the housing 102 has an oversized barrel section 110, an eccentric reducer 120, and a nominal line section 130. A launching mechanism 140 incorporated into the housing 102 includes the guide 106 and the actuator 108.

The barrel section 110 is elongated to stage multiple pigs P in its interior chamber 115. During operation, the launching mechanism 140 launches the pigs P individually into the process flow of the line L to which the launcher 100 is coupled with an isolation valve 32 at the outlet 104B of the launcher 100.

The pig launcher 100 has a horizontally oriented design that connects by means of a flange connection 131 at the outlet 104B to the isolation valve 32. The barrel section 110 is oversized in its diameter, which allows for flow to bypass the pigs and relieves any motive force. For example, the diameter of the barrel section 110 may be twice the diameter of the nominal pipe section 130. The nominal pipe section 130 may be sized to be twice as long as the nominal pipe diameter. The length of the barrel section 110 may be about 14× the line pipe diameter. The distal end of the barrel section 110 either has a flanged connection at the inlet 104A or is prepared with a weld bevel to install a quick opening closure 111 or other access fitting to allow access for loading pigs P into the barrel section 110.

Figure 4A:
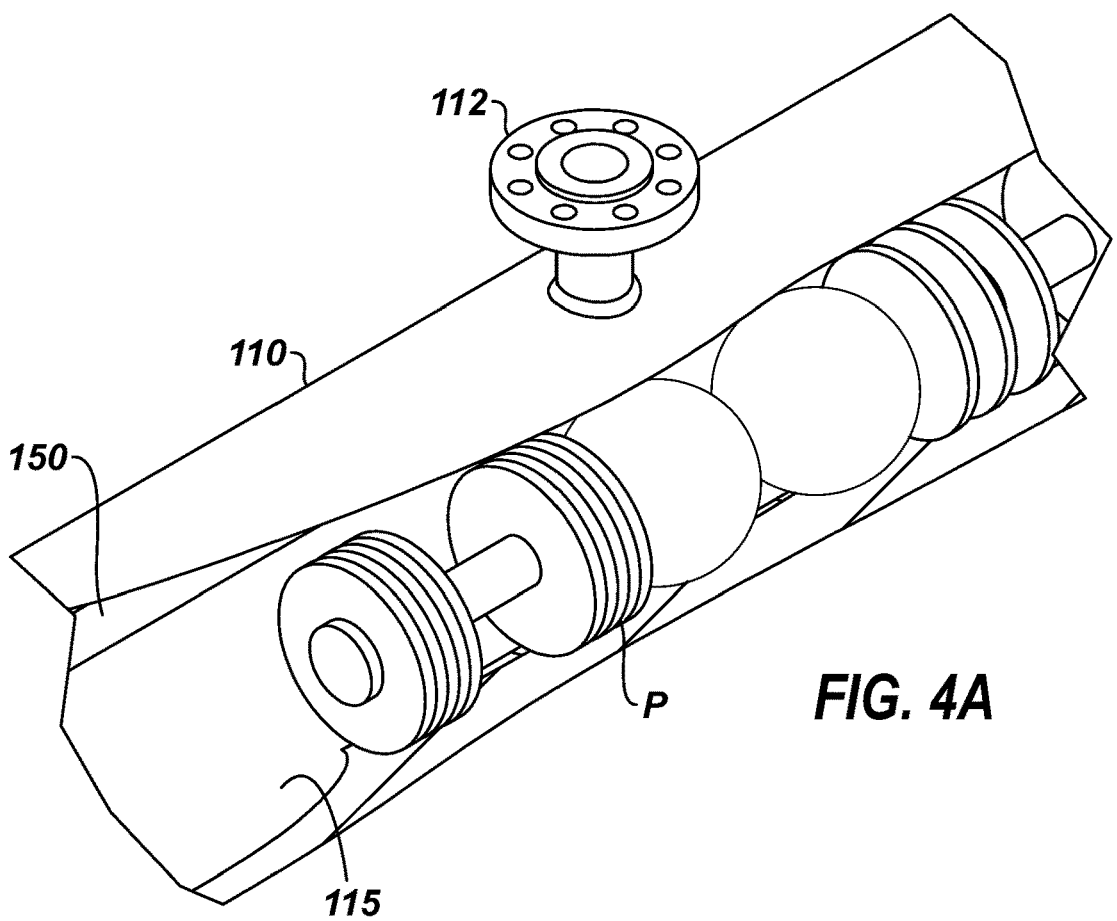
FIGS. 4A-4C illustrate details of nozzles disposed on the disclosed pig launcher.

As noted above, portion of the chamber 105 is in communication with the process flow of the piping system 30 via a number of connections and valves. In particular, a blow-down nozzle or port 112 (shown in detail in FIG. 4A) is disposed toward the top of the housing 110 and communicates with the chamber 115 near the inlet 104A. The blow-down nozzle 112 is used for depressurizing the chamber 115.

Figure 4B:
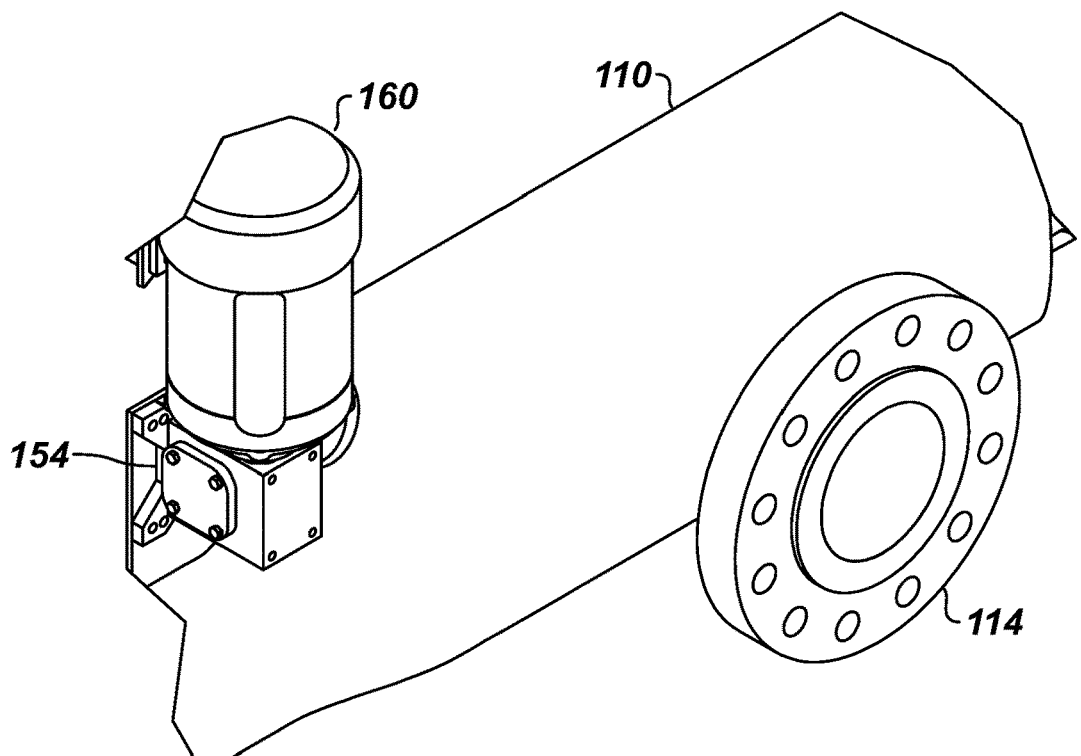

A flow-through nozzle or port 114 (shown in detail in FIG. 4B) is located on the barrel section 110 and is oriented horizontally, one nominal pipe diameter upstream of the distal end of the eccentric reducer 120. The area of the housing 102 upstream from the flow-through nozzle 114 to the outlet 104B forms a flow-through section where process flow continuously flows as part of the launcher's operation.

Figure 4C:
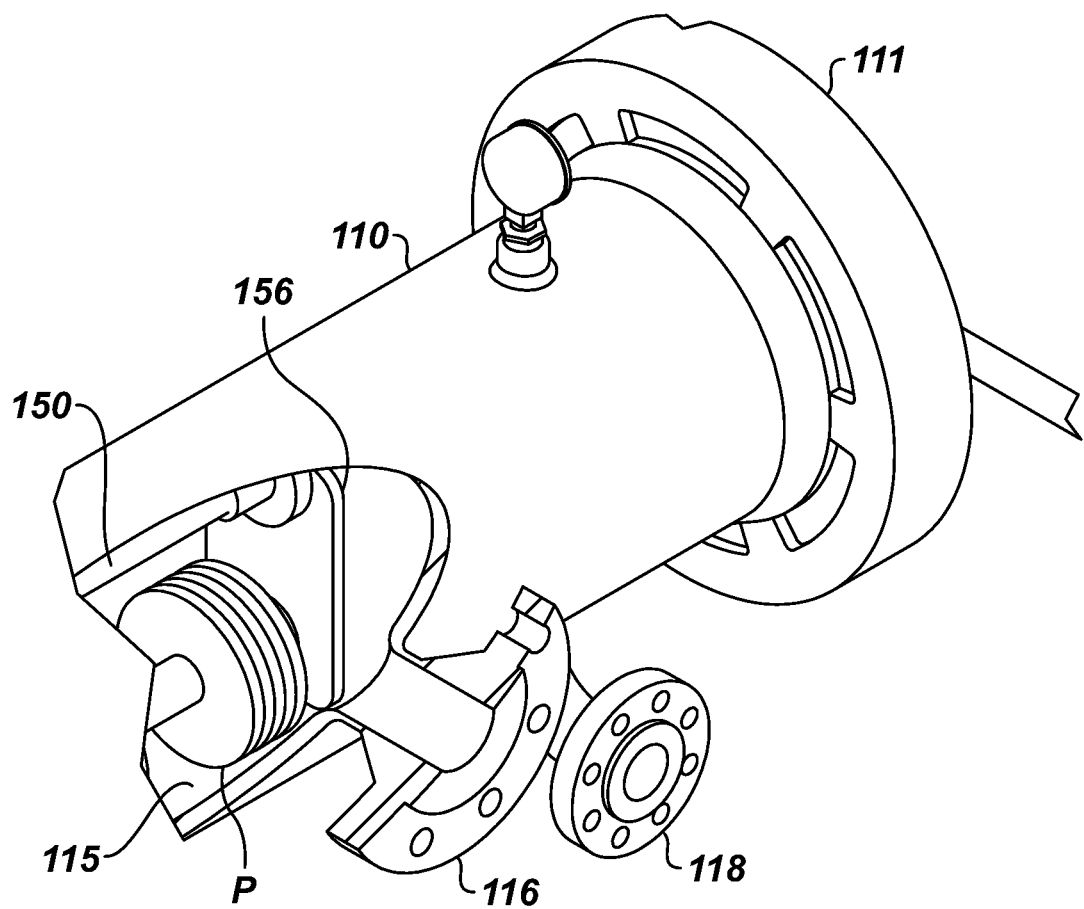

Finally, a kicker nozzle or port 116 and a drain nozzle or port 118 (both shown in detail in FIG. 4C) communicate with the chamber 115 near the inlet 104A. The kicker nozzle 116 is disposed toward the side of the housing 110 and is used for providing a kick of fluid into the chamber 115 when launching a specialized pig that is not launched automatically. The drain nozzle 118 comes off the bottom of the housing 102 and is used for draining the chamber 115 of fluid.

In the present embodiment, the integrated components of the launch mechanism 140 include a worm gear feed screw 150, one or more bearing assemblies 152A-B, a launch paddle 156, a gear box 154, a motor 160, and a controller 170. Some details of the feed screw 150, the paddles 156, etc. are shown in FIG. 2C. Details of the launch mechanism 140 are discussed further below.

In one advantage, the pig launcher 100 is horizontally oriented, which eliminates the need for elevated platforms required to insert the pigs P. Additionally, the oversized barrel section 110 and the pipe section 130 of the launcher 100 (as well as the receiver) are longer for the purpose of launching and receiving multiple pigs P. In particular, the tubular barrel section 110 is elongated to accommodate a series of pipeline pigs P loaded end-to-end to stage their introduction into the pipeline system. Moreover, the disclosed launching mechanism 140 can be adapted to accommodate a various number of pigs P and is not restricted to a specific pig type to be used, launch interval, or pipeline product.

B. Launch Mechanisms

Figure 5A:
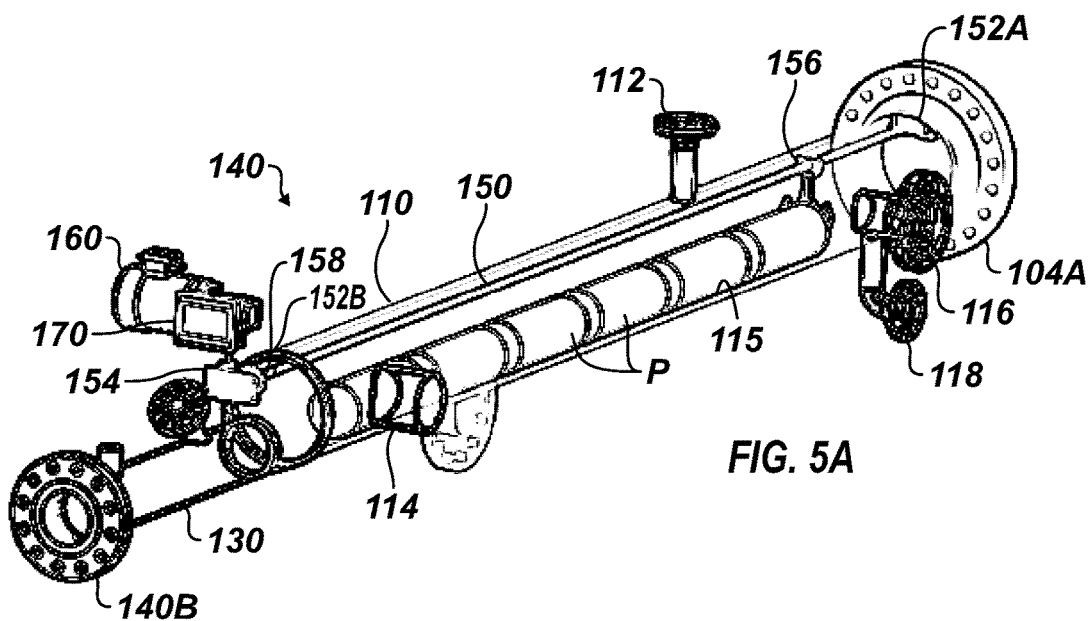
FIGS. 5A-5D illustrate embodiments of launch mechanisms for guiding and mechanically feeding pigs in the disclosed pig launcher.

The launch mechanism 140 introduces (launches) the pipeline pigs P one at a time into the line L of the pipeline system. As noted above, the launch mechanism 140 in FIGS. 2A-2C includes the worm gear feed screw 150 installed inside the elongated barrel section 110. This is represented again more schematically in a transparent view of the launcher 100 in FIG. 5A.

The feed screw 150 is installed at the 12 o'clock position in the barrel section 110 and extends the entire length of the elongated section 110. The feed screw 150 (an example of which is shown in FIG. 6B) can be composed of stainless steel. At its distal end toward the inlet 104A of the barrel section 110, the worm gear feed screw 150 is attached to the barrel section 110 by means of a bearing assembly 152A, which attaches the feed screw 150 to the internal wall of the oversized barrel section 110.

Figure 6A:
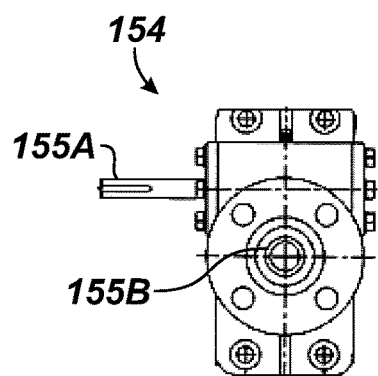
FIG. 6A illustrates a gear box for the disclosed pig launcher.
Figure 6B:
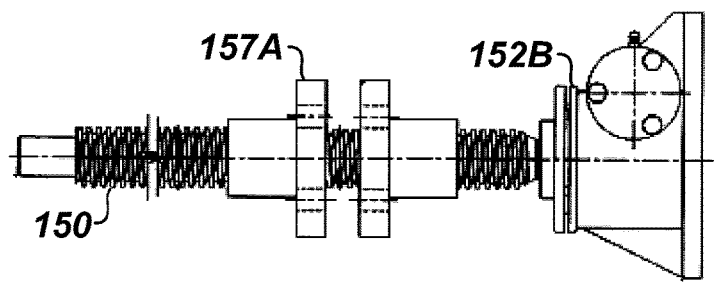
FIG. 6B illustrates a worm gear feed screw for the disclosed pig receiver.
Figure 6C:
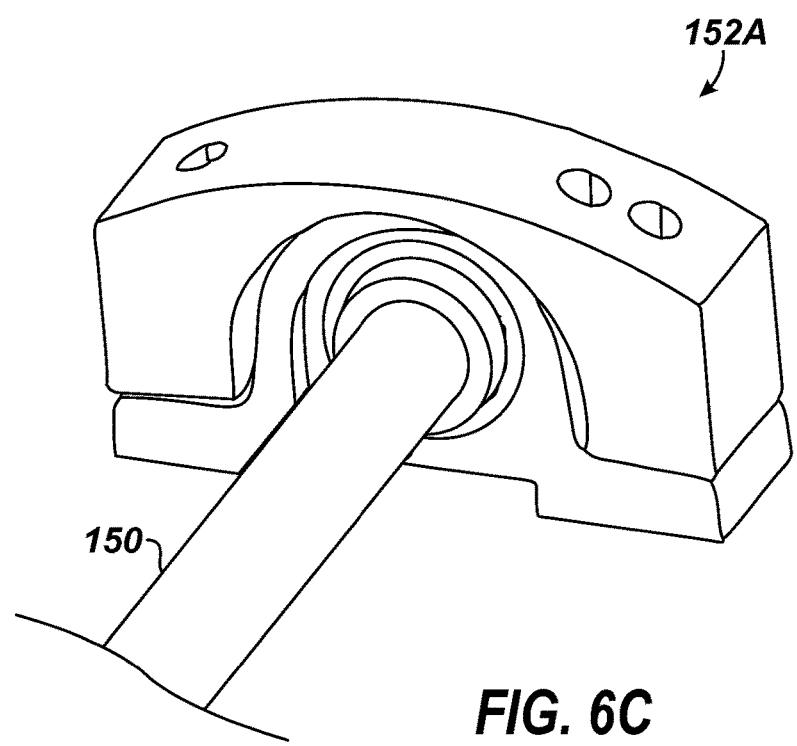
FIG. 6C illustrates a support bearing for the disclosed pig launcher.
Figure 7:
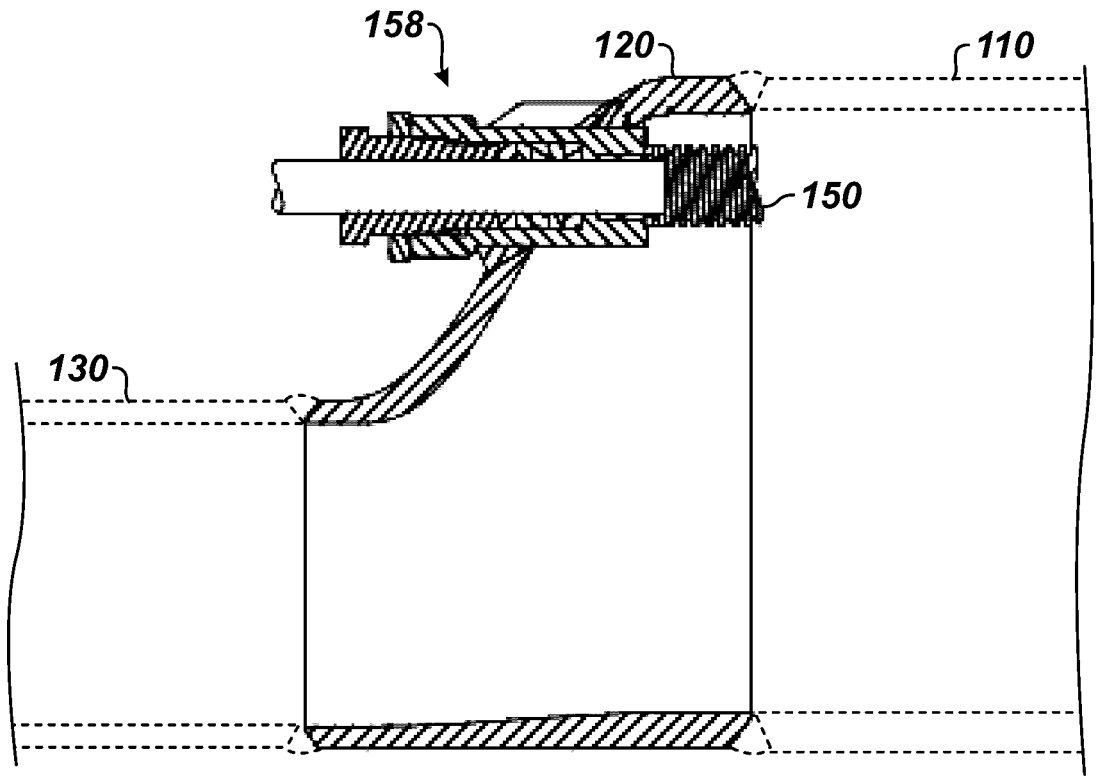
FIG. 7 illustrates a cross-sectional view of a high pressure seal for the worm gear of the disclosed pig launcher.

The bearing assembly 152A can be a pillow block, such as shown in FIG. 6C, which is connected to the barrel section 110 to support the distal end of the worm gear feed screw 150. The feed screw 150 extends to the proximal end of the over-sized barrel section 110 at the 12 o'clock position and can connect to a secondary bearing assembly 152B. Then at the eccentric reducer 120, the feed screw 150 exits the housing 102 with a high pressure seal 158, such as shown in FIG. 7.

The feed screw 150 extends beyond the high pressure seal 158 and connects to an output shaft 155B of a gear box 154 (FIG. 6A). An input gear box shaft 155A (FIG. 6A) can be utilized to install the motor 160 for fully-automated or semi-automated embodiments. Alternatively, the gear box shaft 155A can be hand-operated for manual capabilities.

Figure 8:
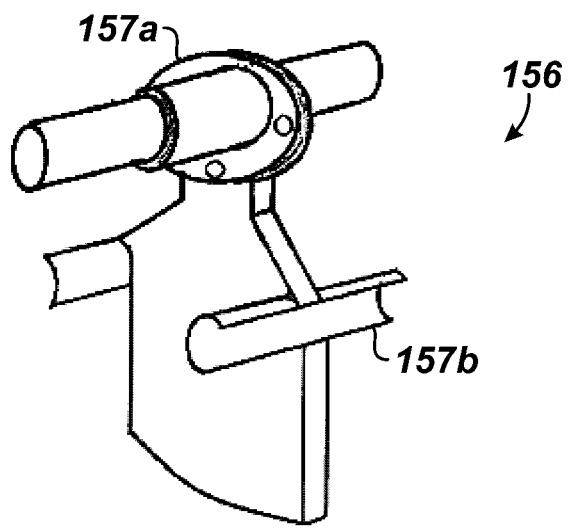
FIG. 8 illustrates a launch paddle for the disclosed pig launcher.

Either way, the worm gear feed screw 150 can be rotated circumferentially within the barrel section 110. Rotation of the feed screw 150 then moves the launch paddle 156 along the feed screw's length so pigs P can be loaded toward the launch reducer 120. Being internal to the barrel section 110, the paddle 156 is movably attached to the feed screw 150 by a threaded coupling 157A (FIG. 8) and travels from the distal end to the proximal end of the barrel section 110 to push the pipeline pigs P into the launch reducer 120.

The motor 160 can be an electric motor, although other drives can be used. For example, a hydraulic motor can be used, but may require a pneumatic supply gas to operate/actuate the launch mechanism 140. Most pneumatic supply gases are provided by natural gas from the pipeline so a pump can drive the hydraulics. There may be methane emissions as the pneumatic pump strokes so using an electric motor can eliminate such methane emissions.

For automated operation, the motor 160 can be connected to a controller 170 having a programmable logic controller and a display. The controller 170 is operable to actuate the motor 160 based on pre-programmed time intervals, local operation, remote operation, or other automated control scheme. Further details of any automated operation are discussed below.

As noted above, the gear box 154 and the motor 160 are preferably disposed external to the barrel section 110. Therefore, the connection of the gear box 154 to the worm gear feed screw 150 passing through the housing's wall uses the high-pressure seal 158, as shown in FIG. 7. The high pressure seal 158 seals the extended gear drive mechanism from the internal line pressure so that it can be operated external to the pressurized side of the launch mechanism 140.

In general, the seal 158 can be created in several ways, including but not limited to one or more of: an O-ring type seal being of either conventional or one of the many existing varieties of cross-section, a lip-type rotary seal, or a conventional stuffing box arrangement (e.g., a gland-type of stuffing box seal). For the gland-type seal, a loosely braided or otherwise deformable sealing material is layered in a cavity around the shaft of the feed screw 158 passing through the barrel wall. A packing gland/nut, which generates a large force along the axis of the shaft, is used to compress the seal material within the cavity causing it to exert pressure against the cavity wall and shaft surface. Sufficient force is applied so that the compression forces of the packing material exceed the pressure being contained and leakage is prevented. As will be appreciated, the sealing and packing area of the seal 158 can be incrementally increased based on the specified pipeline pressures and other requirements of an implementation.

In addition to the feed screw 150, the paddle 156, and other features for the launch mechanism 140 to guide and mechanically feed the pigs P horizontally, other mechanisms can be used. For example, the launch mechanism 140 can use a motor, a feed screw, a cable, a cylinder, or other drive member used in conjunction with a paddle, a cradle, a tray, or the like. Pigs may also be positioned for launch using a conveyor belt type mechanism.

Although a rotatable feed screw 150 and paddle 156 have been disclosed above for the launch mechanism 140, other actuators and guides can be used to move the staged pigs P along the length of the barrel section 110. In this regard, hydraulic or pneumatic cylinders can have arms that move inside the barrel section 110 and push and/or pull the paddle 156 inside the barrel section 110. The paddle 156 may be supported on rails or the like. Alternatively, a rack and pinion system could be used. As will be appreciated with the benefit of the present disclosure, these and other mechanisms can be used to move the pigs in the launcher 140.

Figure 5B:
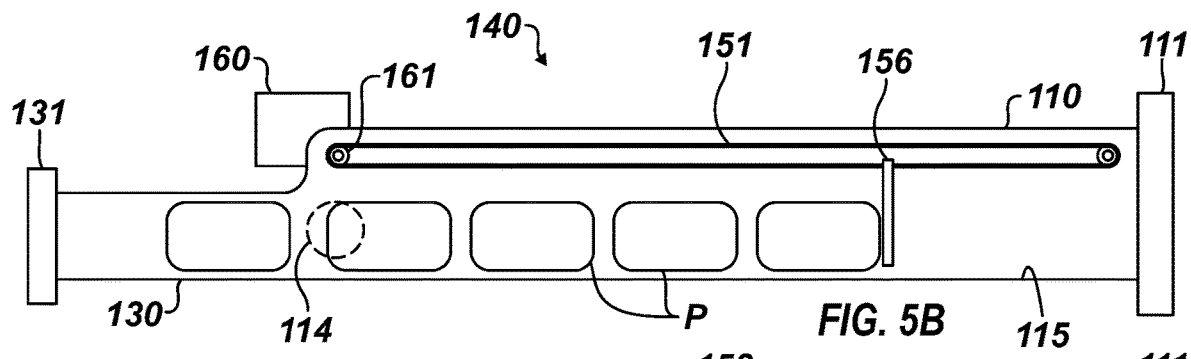

FIG. 5B shows an example of a launch mechanism 140 having a motor 160 that rotates a drive belt 151 with a gear 161. Forward and reverse rotation of the gear 161 can move a paddle 156 on the belt 151 back and forth in the chamber 115 of the barrel section 110. In this way, pigs P can be individually fed with the belt 151 to the area adjacent the feed-through nozzle 114 upstream of the line section 130 of the launcher 100.

Figure 5C:
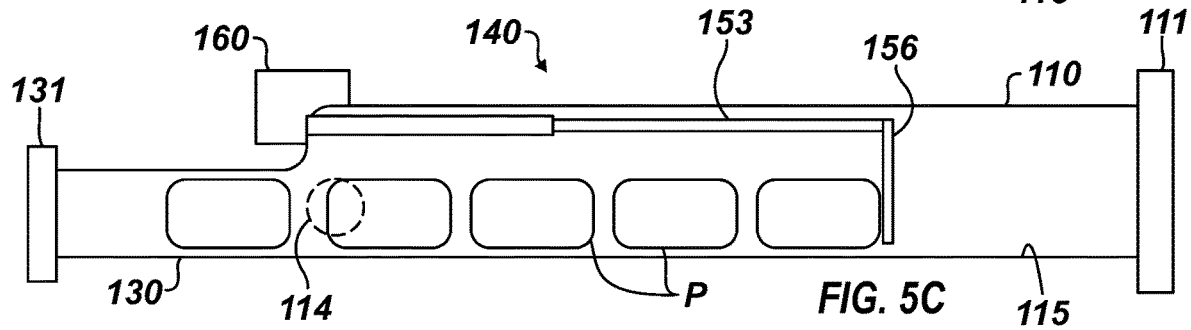

FIG. 5C shows another example of a launch mechanism 140 having a motor 160 that moves a linear actuator 153. For example, the motor 160 can be hydraulic, and the linear actuator 153 can be a piston or the like. Extension and retraction of the linear actuator 153 can move a paddle 156 back and forth in the chamber 115 of the barrel section 110. In this way, pigs P can be individually fed with the linear actuator 153 to the area adjacent the feed-through nozzle 114 upstream of the line section 130 of the launcher 100.

Figure 5D:
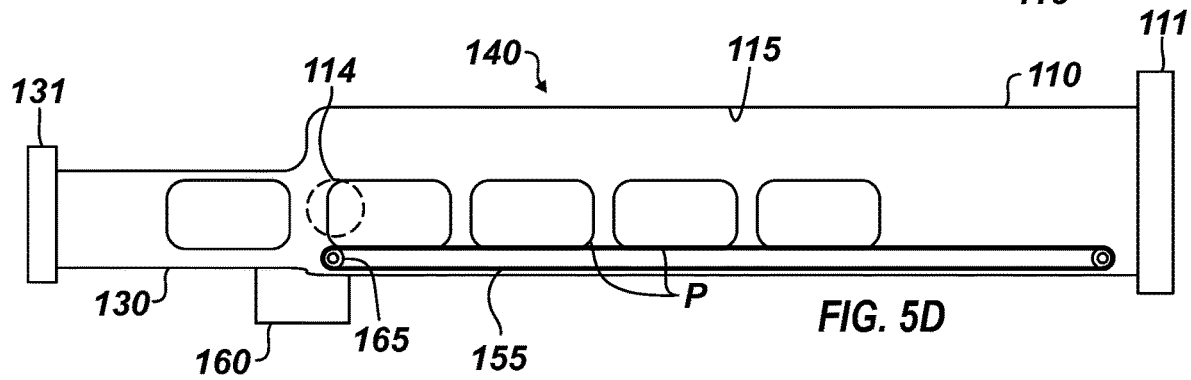

FIG. 5D shows yet another example of a launch mechanism 140 having a motor 160 moves a conveyor belt 155 with a gear 165. Forward and reverse rotation of the gear 165 can move the conveyor belt 151 back and forth in the chamber 115 of the barrel section 110. In this way, pigs P can be individually fed with the belt 155 to the area adjacent the feed-through nozzle 114 upstream of the line section 130 of the launcher 100.

As the various launch mechanisms 140 disclosed in FIGS. 5A-5D will show, a number of different mechanisms that guide and actuate can move pigs P in the barrel section 110 and can be used with the launcher 100. Accordingly, these and other alternatives of the disclosed launch mechanisms 140 can be used. Moreover, discussion herein may refer to the components of the launch mechanism 140 in FIG. 5A, but not necessarily others as in FIGS. 5B-5D. However, it will be appreciated with the benefit of the present disclosure that features discussed herein can be readily adapted to the various disclosed launch mechanisms.

C. Launch Tray

Figure 9A:
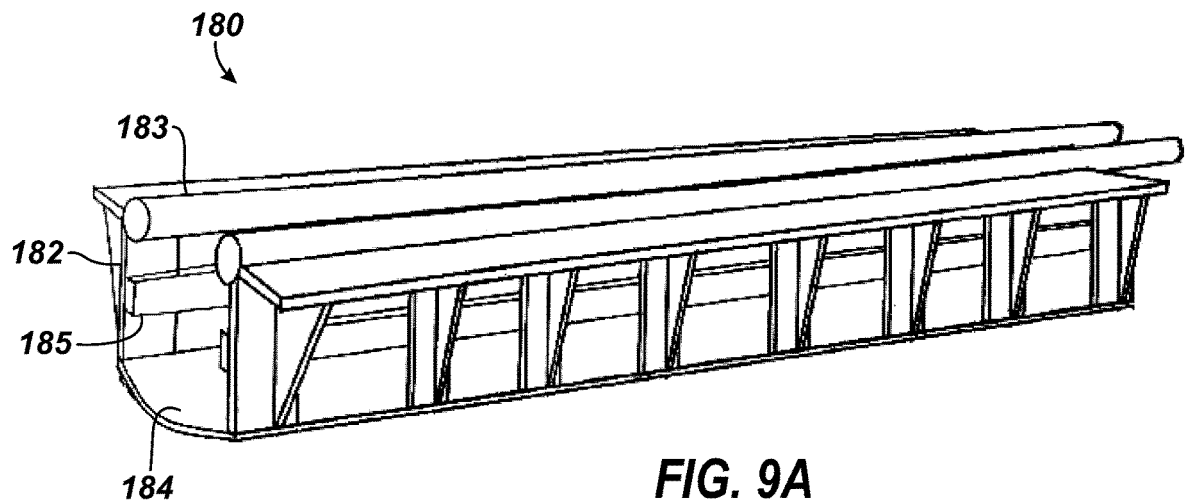
FIGS. 9A-9B illustrate perspective and end views of a launch tray for the disclosed pig launcher.
Figure 9B:
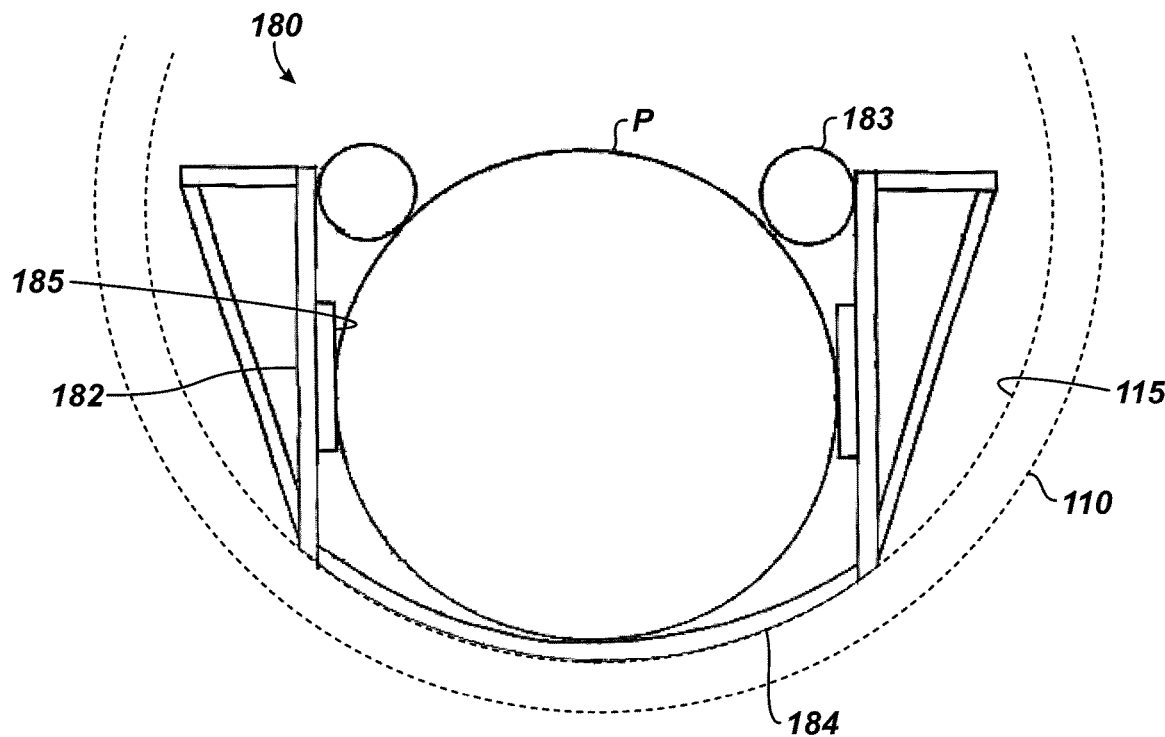

Most commonly, but not always, a launch tray 180 as shown in FIGS. 9A-9B can install into the bottom of the barrel section 110 to stage multiple pipeline pigs P into the launch mechanism 140. The launch tray 180 can be removed from the barrel section 110, loaded with a specific number of pigs P, and reinserted into the barrel section 110 to stage the pigs P for launching. In general, the launch tray 180 is a channel in which pigs P are horizontally placed for staging into the launching mechanism 140.

The launch tray 180 includes sidewalls 182 and a curved base 184 for resting in the barrel section 110. Guide rails 183 are provided on the sidewalls 182 to help hold the pigs P on the base 184. Additionally, the guide rails 183 can allow guide arms, such as arms 157b on the paddle 156 in FIG. 8, to ride and guide movement of the paddle 156 along the launch tray 180 as the paddle 156 is moved inside the barrel section 110. Friction guides 185 can also be installed on the sidewalls 182 of the tray 180 to produce friction on the moving pigs P. This controlled friction from the guides 185, the base 184, etc. on the tray 180 can be used to ensure that only one pig P at the end of the tray 180 is fed into the reducer 180 at a time during a launch sequence.

Depending on the pigs P used, the launch tray 180 may not be needed, or a particular launch tray 180 may have adjustable components (e.g., sidewalls 182, guide rails 183, etc.) that allow it to accommodate different types of pigs. Alternatively, a different launch tray may be used to accommodate different types of pigs. For example, the launch tray 180 need not be an open-type of bed with sidewalls 182 and base 184. Instead, the launch tray 180 can be an elongated canister for staging the pigs P and can be composed of a perforated aluminum tube or the like having a slot to accommodate the paddle's passage.

D. Controller/Automation

As noted above, an external drive mechanism (e.g., gear box 154, motor 160, etc.) operates the launch mechanism 140. The external drive mechanism can be operated manually, semi-automatically, and automatically. In particular, to operate the launch mechanism 140 manually, operators can manually operate the shaft 155A of the worm gear drive mechanism with a wrench or a drill motor to actuate the pig paddle 156 towards the reducer 120 to launch a pipeline pig P. In this manual operation, the travel distance of paddle 156 is controlled by the number of turns made to the extended gear shaft 155A.

The launch mechanism 140 can also be operated automatically or semi-automatically. As noted previously, the gear shaft 155A of the drive mechanism 154 can be operated with a motor 160, such as an explosion-proof electric motor, to actuate the launch paddle 156 towards the reducer 120 to launch a pipeline pig P. The electric motor 160 can be controlled semi-automatically by an operator with an ON/OFF switch to the desired paddle travel distance. Alternatively, the electric motor 160 can be controlled automatically by programmed logic of the controller 170.

In general, the controller 170 can include a control panel, which can display control screens to program the specific launch interval, launch time, remote actuation, or other operation. The controller 170 is programmed in accordance to the pig type and pig length. In turn, the controller 170 controls the electric motor 160 and the travel distance of the paddle 156 to launch pipeline pigs P. In short, the controller 170 controls the actuation of the launching mechanism 140 for the fully-automated operation.

The controller 170 can have an Ethernet or other connection to remotely access the launch mechanism 140 to monitor performance and/or control the launching of a pipeline pig P. The controller 170 also operates as a terminal to monitor pig passages with a signal receiver from a remote pig signaler, and the controller 170 can monitor the amperage during operation of the launcher 100, among other monitoring operations.

The controller 170 may have connections to (or may use any signals from) flow sensors, pig detectors, or other sensing equipment, and the controller 170 can use such signals to control operation of the launcher 100 automatically. For example, the controller 170 can have a number of auxiliary terminals to provide various functions. In particular, the controller 170 can use a pig signaler 137 located on the nominal pipe section 130 immediately downstream of the eccentric reducer 120. Signals from the signaler 137 can be used by the controller 170 to validate passage of a pig P whenever the launch mechanism 140 has launched a pig P.

The controller 170 may also receive a signal from a signaler located downstream of the mainline isolation valve 32 attached to the pig launcher 100 to validate a pig's passage, and the controller 170 can use that information to determine that the pig is traversing the pipeline L whenever the launch mechanism 170 has launched a pig P. Additionally, the controller 170 can have a terminal connection to a remotely-operated valve that can act as a fail-safe mechanism. In this sense, the controller 170 can automatically shut-off the pig launcher 100 any time that the mainline isolation valve 32 is closed.

FIGS. 10A-10D illustrate example user interface screens 176a-d for programming the controller 170 to operate the disclosed launcher 100. In FIG. 10A, the first screen 176a shows an example of how an operator can set the number of pigs P to be loaded in the launcher 100. The length of each pig P can be input, should different length pigs P be used. The timing of the launch for the various pigs P can also be input. The number of pigs P in the barrel section 100 and the position of the paddle 156 inside the section 100 can be known and displayed. Manual mode or over-ride controls may also allow operators to manually move the paddle 156 back and forth.

The screen 176b in FIG. 10B shows some input and control information of the controller 170. The screen 176c in FIG. 10C shows how an operator can set different launch intervals for the various pigs P and can set when a first launch is to take place. Finally, the screen 176d in FIG. 10D shows how the length of a given pig P can be input so the controller 170 can track the position of the pig P in the section 110 and the needed movement of the paddle 156 and the like to launch the pig P.

As these user interface screens 176a-d will show, the controller 170 of the present disclosure can be programmed in a number of ways and with a number of inputs to control operation of the disclosed launcher 100. As will be appreciated, these and other inputs and controls can be used.

E. Operation

In operation, the pig launcher 100 can stage multiple pipeline pigs P from the horizontally-oriented pig launch mechanism 140 and can launch a single pig P from the housing 102 in liquid and gas service from its horizontal orientation. The launch mechanism 140 can be fully-automated, semi-automated, or manually-operated and can launch various types of pigs P on a controlled basis.

For fully-automated operation, operators can program the controller 170 to operate the electric gear-operated pig launch mechanism 140 based on pipeline pig length and other factors. In this way, the launcher 140 can launch a single pig P and can stage multiple pipeline pigs P even in low flow conditions.

With an understanding of the pig launcher 100 and its components, particular discussion is provided on the operation of the launcher 100 to launch pigs for a pigging operation. Initially, all valves must be in the closed position to initiate the operation of the pig launching mechanism 140. For example, the closed valves on the housing 102 as in FIG. 2A include the mainline isolation valve 32, the flow-through valve 34 for the flow-through nozzle 114, the blow-down valve 38 for the blow-down nozzle 112, the kicker valve 36 for the kicker nozzle 116, and the drain valve (not shown) for the drain nozzle 116. The pig launching sequence is initiated by opening the access door 111 located at the input 104A of the over-sized barrel section 110 after the pressure has been relieved from the entire launch system by opening the system's blow-down nozzle 112 located at the 12 o'clock orientation.

The launch paddle 156 is removed from the feed screw 150, and the launch tray 180, if used, is removed at the inlet 104A from the over-sized barrel section 110 in the distal direction. Pigs P are loaded into the launch tray 180, and the launch tray 180 is reinserted into the over-sized barrel section 110. If a launch tray 180 is not used, the pigs P are loaded directly into the over-sized barrel section 110.

The access door 111 is closed, then the valve 38 for the blow-down nozzle 112 is closed to allow for pressurization of the launcher 100. The flow-through valve 34 is slowly opened to equalize the pressure between the launcher 100 and the line L. The flow-through nozzle valve 34 will remain in the "open" position throughout the duration of the operation of the launch mechanism 140. Once the pressure has equalized in the automated launcher 100, the mainline valve 32 is opened.

In preparation of the operation, the controller 170 can be programmed for fully-automated operation, as shown by the example screens 176 in FIGS. 10A-10D. The pig length, number of pigs, schedule for the first pig launch, and the interval for subsequent launches are entered into the controller 170. The controller 170 will actuate a pig of a specific length at the scheduled time based on the travel distance of the launch paddle 156 in the proximal direction into the eccentric reducer 120.

Alternatively, semi-automated launch operations can be performed by activating the electric motor 160 for a predetermined period based on the measured pig length and travel distance of the launch paddle 156 in the proximal direction into the eccentric reducer 120. In this semi-automated operation, the launcher 100 does not necessarily need to be equipped with a controller 170 since the semi-automated function can be operated with the motor 160 to actuate the mechanical launch mechanism 140.

As noted previously, manual operation can also be performed by turning the gear box shaft 155A the appropriate revolutions to actuate the launch paddle 156 the measured length of one pig P in the proximal direction to the eccentric reducer 120. For a manually operated implementation, the launcher 100 does not require a motor 160 or a controller 170 since the launcher 100 is hand-operated to actuate the mechanical launch mechanism 140.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

Although the pig launcher 100 has been described as being used horizontally at an installation, this is not strictly necessary since the launcher 100 can be used in other orientations and can even be angled. In fact, it is contemplated that the launcher 100 can be oriented vertically with the paddle 156 moving the pigs P upward to the pipeline or downward to the pipeline. If fed upward, the angled or vertical launcher 100 may not require much alteration to accommodate individually introducing the pigs P to the pipeline. However, if fed downward, a hydraulic mechanism (pin or the like) may be needed to stop the advance of the pigs P in the angled or vertical launcher 100.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for launching one or more pigs into a process flow, the apparatus comprising:
   a housing defining a chamber with a longitudinal axis and having an inlet and an outlet, the inlet receiving the one or more pigs into the chamber, the outlet in communication with the process flow and passing the one or more pigs out of the chamber to the process flow, a portion of the chamber in communication with the process flow;
   a guide disposed in the chamber and guiding the one or more pigs in the chamber, at least a portion of the guide movable along the longitudinal axis of the chamber; and
   an actuator comprising a motor rotating a screw operatively coupled to the portion of the guide, the actuator being configured to mechanically feed the one or more pigs guided by the guide along the longitudinal axis toward the outlet.

2. The apparatus of claim 1, wherein the portion of the guide comprises a paddle, and wherein the actuator is operatively coupled to the paddle, the actuator mechanically feeding the one or more pigs guided by the paddle toward the outlet.

3. The apparatus of claim 1, wherein the guide comprises a tray installed in the chamber and holding the one or more pigs thereon.

4. The apparatus of claim 3, wherein the tray defines a channel having a base and sidewalls.

5. The apparatus of claim 3, wherein at least a portion of the tray is adjustable to accommodate different sizes of the one or more pigs.

6. The apparatus of claim 1, further comprising a controller operatively coupled to the actuator and controlling the mechanical feed of the one or more pigs toward the outlet.

7. The apparatus of claim 6, wherein the controller is programmable to control the mechanical feed based on one or more of a length of the one or more pigs, a number of the one or more pigs, a schedule for a launch of a first of the one or more pigs, and an interval for subsequent launch of a subsequent one of the one or more pigs.

8. The apparatus of claim 1, wherein the housing defines a reducer between the chamber and the outlet, the reducer eccentrically transitioning a larger internal dimension of the chamber to a smaller internal dimension of the outlet.

9. The apparatus of claim 1, wherein the outlet comprises a flange connecting to piping of the process flow; and/or wherein the inlet comprises a closure being sealable to open and close access to the chamber.

10. The apparatus of claim 1, wherein the portion of the chamber in communication with the process flow comprising a port on the housing in communication between the process flow and an area of the chamber upstream of the outlet, the port directing a portion of the process flow into the chamber upstream of the outlet.

11. The apparatus of claim 10, further comprising a flow-through valve coupled to the port and being operable to flow-through the portion of the process flow from the port to the outlet.

12. The apparatus of claim 11, further comprising one or more of:
   a mainline valve in communication between the outlet and the process flow, the mainline valve being operable to direct the one or more pigs and any directed portion of the process flow from the chamber into the process flow;
   a blow-down valve in communication with the chamber and being operable to direct blow-down into the chamber; and
   a kicker valve in communication between the process flow and the chamber toward the inlet, the kicker valve being operable to direct a kick of the process flow into the chamber.

13. The apparatus of claim 1, further comprising a drain valve in communication with the chamber and being operable to drain fluid from the chamber.

14. The apparatus of claim 1, wherein the outlet comprises an indicator indicating passage of the one or more pigs.

15. The apparatus of claim 1, further comprises a receiver in communication with the process flow and receiving the one or more pigs.

16. An apparatus for launching one or more pigs into a process flow, the apparatus comprising:
   a housing defining a chamber with a longitudinal axis and having an inlet and an outlet, the inlet receiving the one or more pigs into the chamber, the outlet in communication with the process flow and passing the one or more pigs out of the chamber to the process flow, a portion of the chamber in communication with the process flow;
   a guide disposed in the chamber and guiding the one or more pigs in the chamber, at least a portion of the guide comprises a paddle movable along the longitudinal axis of the chamber; and
   an actuator operatively coupled to the paddle and mechanically feeding the one or more pigs guided by the paddle along the longitudinal axis toward the outlet, wherein the actuator comprises a motor moving a belt along the longitudinal axis, the paddle coupled to the belt and movable with the movement of the belt.

17. The apparatus of claim 16, further comprising a controller operatively coupled to the actuator, wherein the controller is programmable to control the mechanical feed based on one or more of a length of the one or more pigs, a number of the one or more pigs, a schedule for a launch of a first of the one or more pigs, and an interval for subsequent launch of a subsequent one of the one or more pigs.

18. An apparatus for launching one or more pigs into a process flow, the apparatus comprising:
   a housing defining a chamber with a longitudinal axis and having an inlet and an outlet, the inlet receiving the one or more pigs into the chamber, the outlet in communication with the process flow and passing the one or more pigs out of the chamber to the process flow, a portion of the chamber in communication with the process flow;

a guide disposed in the chamber and guiding the one or more pigs in the chamber, wherein at least a portion of the guide movable along the longitudinal axis of the chamber comprises a conveyor belt having the one or more pigs disposed thereon; and an actuator operatively coupled to the portion of the guide and mechanically feeding the one or more pigs guided by the guide along the longitudinal axis toward the outlet, wherein the actuator comprises a motor moving the conveyor belt along the longitudinal axis of the chamber.

19. The apparatus of claim 18, further comprising a controller operatively coupled to the actuator, wherein the controller is programmable to control the mechanical feed based on one or more of a length of the one or more pigs, a number of the one or more pigs, a schedule for a launch of a first of the one or more pigs, and an interval for subsequent launch of a subsequent one of the one or more pigs.

20. An apparatus for launching a plurality of pigs into a process flow, the apparatus comprising:

a housing defining a chamber with a longitudinal axis and having an inlet and an outlet on the longitudinal axis, the inlet configured to receiving the pigs arranged end-to-end into the chamber, the outlet in communication with the process flow and configured to pass the pigs in the longitudinal direction out of the chamber to the process flow, a portion of the chamber in communication with the process flow;

a guide disposed in the chamber and guiding the pigs in the chamber, wherein a portion of the guide comprises a surface engaging at least a last of the pigs and being movable continuously along the longitudinal axis of the chamber from the inlet toward the outlet; and an actuator operatively coupled to the portion of the guide, wherein the actuator is configured to move the pigs-arranged end-to-end from a first to the last along the length of the chamber guided by the surface and is configured to mechanically feed each of the pigs successively from the first to the last toward the outlet.

21. The apparatus of claim 20, wherein the portion of the guide movable along the longitudinal axis of the chamber comprises a belt having a surface thereon; and wherein the actuator comprises a motor moving the belt having the surface along the longitudinal axis of the chamber.

22. The apparatus of claim 20, wherein the portion of the guide comprises a paddle having the surface, and wherein the actuator is operatively coupled to the paddle.

23. The apparatus of claim 22, wherein the actuator comprises a motor rotating a screw, the paddle coupled to the screw and movable therealong with the rotation of the screw.

24. The apparatus of claim 22, wherein the actuator comprises a linear actuator movable along the longitudinal axis, the paddle coupled to the linear actuator and movable with the movement of the linear actuator.

25. The apparatus of claim 24, wherein the linear actuator comprises a hydraulic piston, a pneumatic cylinder, or a linear motor.

26. The apparatus of claim 20, further comprising a controller operatively coupled to the actuator, wherein the controller is programmable to control the mechanical feed based on one or more of a length of the pigs, a number of the pigs, a schedule for a launch of the first of the pigs, and an interval for subsequent launch of a subsequent one of the pigs.

* * * * *